No. 714,308. Patented Nov. 25, 1902.
I. J. KAAR.
LISTER ATTACHMENT FOR PLANTERS.
(Application filed Apr. 19, 1902.)
(No Model.) 3 Sheets—Sheet 1.
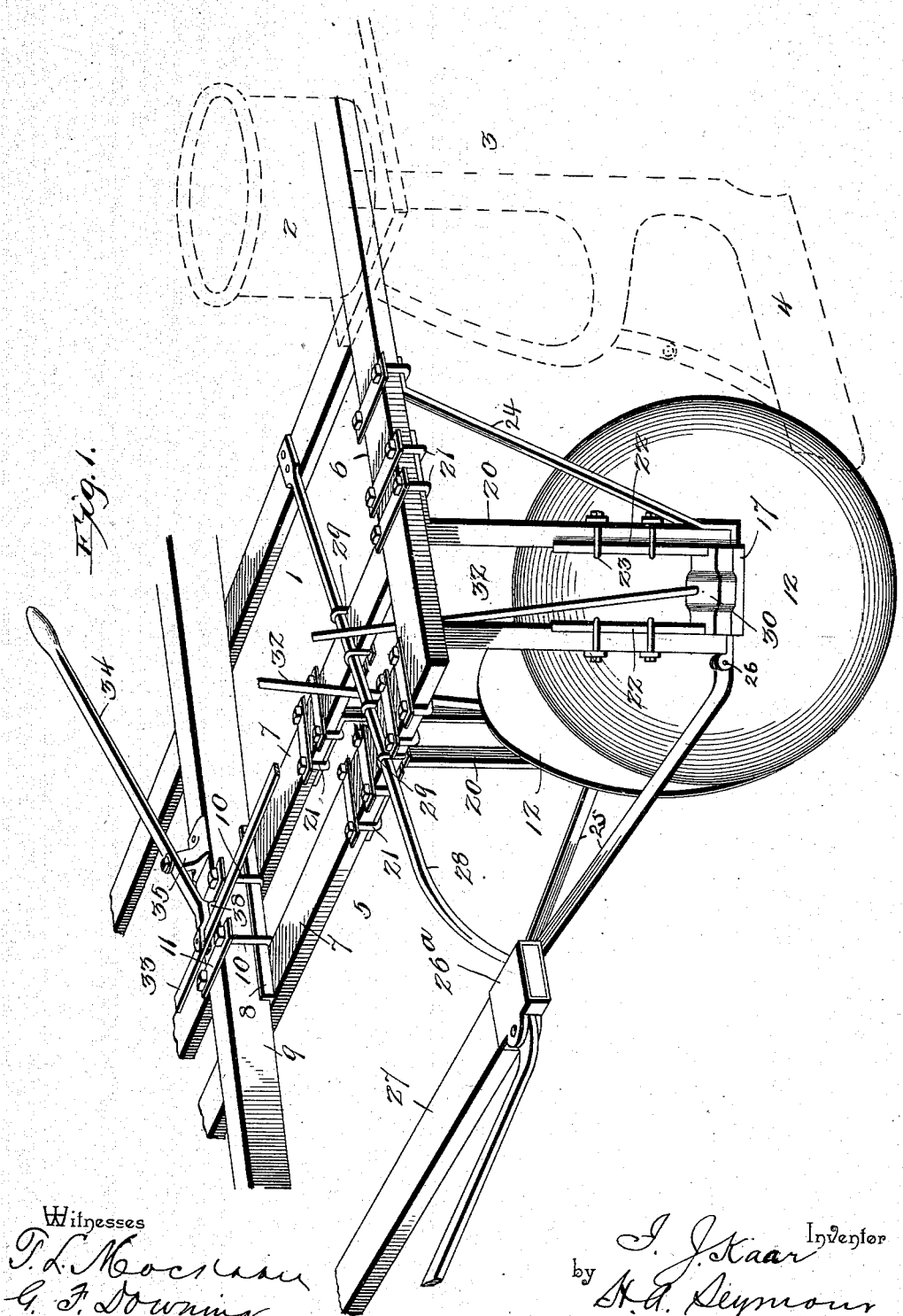
Witnesses
T. L. Mocuaau
G. F. Downing.
Inventor
I. J. Kaar
by H. A. Seymour
Attorney.

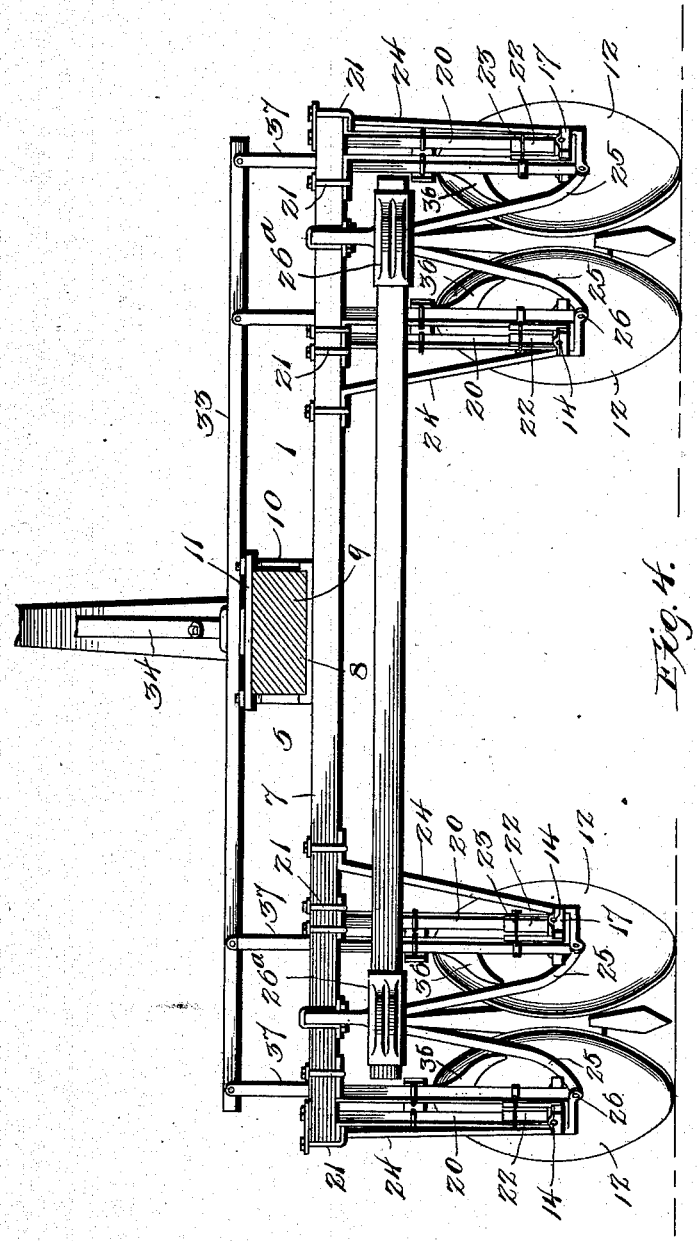
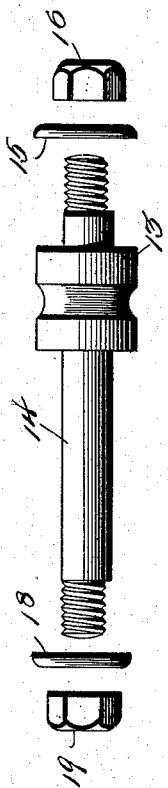

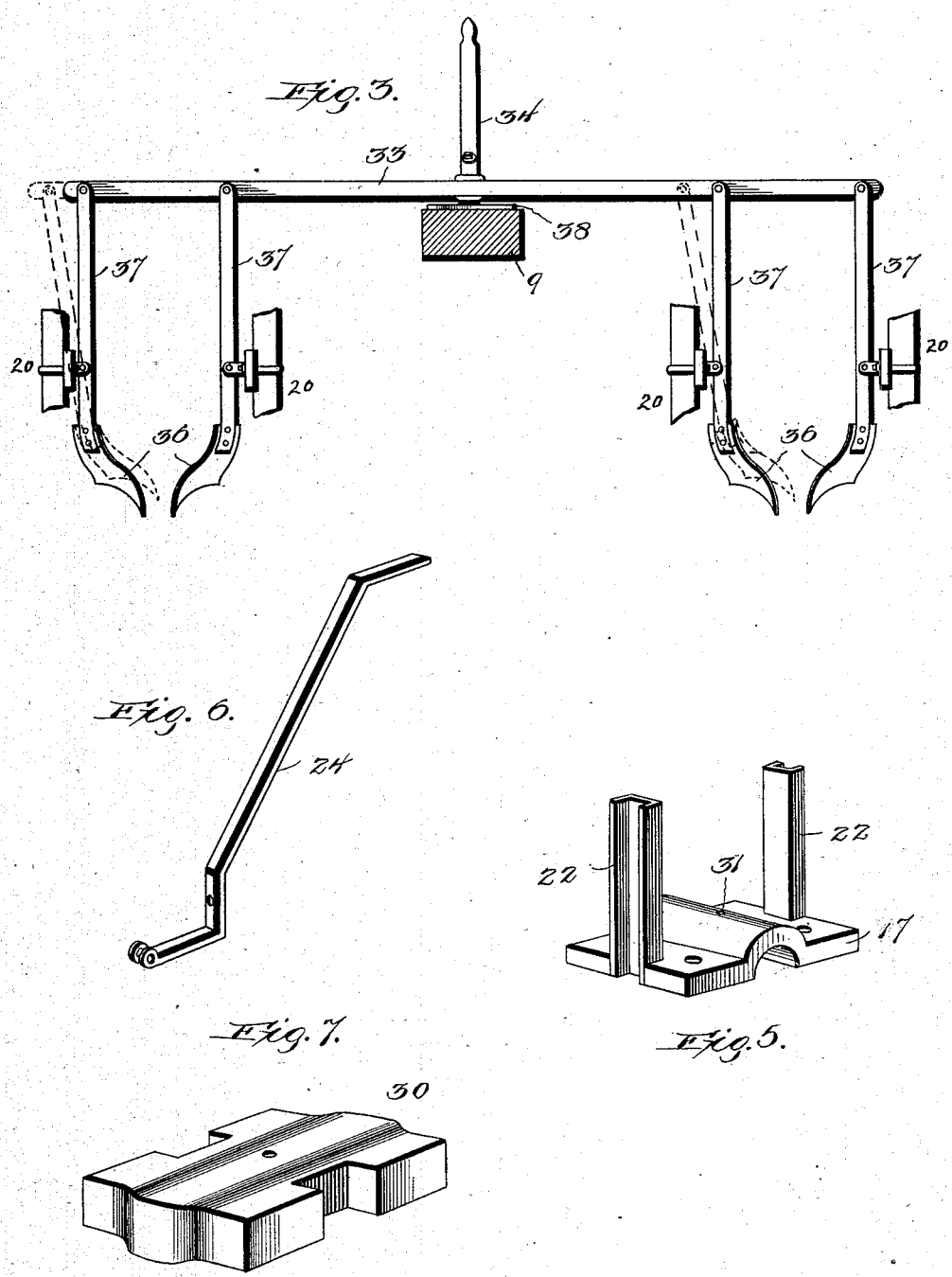

UNITED STATES PATENT OFFICE.

IRA JAMES KAAR, OF HAVELOCK, NEBRASKA.

LISTER ATTACHMENT FOR PLANTERS.

SPECIFICATION forming part of Letters Patent No. 714,308, dated November 25, 1902.

Application filed April 19, 1902. Serial No. 103,790. (No model.)

*To all whom it may concern:*

Be it known that I, IRA JAMES KAAR, a resident of Havelock, in the county of Lancaster and State of Nebraska, have invented certain new and useful Improvements in Lister Attachments for Planters; and I do hereby declare the following to be a full, clear, and exact description of the invention, such as will enable others skilled in the art to which it appertains to make and use the same.

My invention relates to an improved lister attachment for planters, and more particularly to a disk lister attachment which can be secured to any corn or similar planter to open a comparatively deep furrow in advance of the shoe to permit the corn to be planted sufficiently deep to withstand hot winds, the object of the invention being to provide improvements of this character which will be extremely simple in construction, comparatively cheap to manufacture, and strong and durable when in use.

A further object is to provide improved mounting for two divergent disks which will permit of the adjustment of the disks according to the depth and width of the furrow to be cut.

With these objects in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a front view partly in section. Fig. 3 is a view illustrating the disk-cleaning mechanism, and Figs. 4, 5, 6, and 7 are views illustrating various details of construction.

In some localities—for instance, in Iowa, Nebraska, Kansas, and Missouri—it is necessary to plow the ground in the spring of the year, prior to planting, to compel the ground to absorb all moisture, and as these localities are frequented by hot winds it is necessary to plant the corn sufficiently deep in this loose soil (previously plowed) to protect the corn from such hot winds. This has never been successfully accomplished with machines heretofore, and it is the object of my invention to provide improvements which can be attached to any ordinary planter, and which will insure the planting sufficiently deep in this loose ground to prevent the corn being ruined by the hot winds; and my improved attachment will now be described in detail.

1 represents a section of corn-planter frame carrying seed-receptacle 2, seed-tube 3, and shoe or furrow-opener 4, to plant the seed in the ground, and to this frame 1 my improved lister-frame 5 is secured, and comprises longitudinal cross-bars 6, connected together and to frame 1 by cross-bars 7. The bars 7 are connected centrally by a flanged plate 8, in which the tongue 9 is secured by U-bolts 10 and straps 11, as clearly shown in Figs. 1 and 2. The disks 12 are located just in advance of the shoe 4 and are arranged in pairs, one disk being on each side of the shoe and located at an angle to each other and to the line of movement of the shoe to throw the earth out on each side. Each disk is preferably of the concavo-convex type, and is secured against an enlargement 13 on a journal 14 (see Fig. 4) by a washer 15 and nut 16, and the journal is secured in a split bearing 17 by a washer 18 and nut 19, as clearly shown in the detail views. The split bearings 17 are grooved at their ends to receive U-shaped brackets 20, bent at their upper ends at right angles and secured to frame 5 by U-bolts 21, as clearly shown in Fig. 1, to dispose the bearings at the proper angle to hold the disks in position to open a furrow, and these bearings can be adjusted by moving the brackets to secure the disks at any angle. To permit the adjustment of the bearings up and down on the brackets, I connect the bearings and brackets by means of flanged guide-bars 22 to receive the vertical members of the brackets and slide thereon and be secured at any position by U-bolts 23, thus permitting the operator to regulate the depth of planting to suit the particular condition of the soil. Brace-bars 24 and 25 also support the bearings, the former shaped as shown in Fig. 6, secured at one end to frame 5 by U-bolt and bent at its other end to project beneath the bearing and secured to bracket 20. The forward end of each brace-bar 24 is bifurcated and made with alined openings to receive a bolt 26 and pivotally secure one end of bar 25 therein. The other end of bar 25 is pivotally connected with a metal sleeve 26ª on an equalizing-bar 27, connected with the tongue, and to this pivotal connection with sleeve 26ª another brace-bar 28 is pivotally connected and extends across and is secured to frame 5 by U-bolts 29.

On each of the bearings I provide a box-cover 30 of approximately the shape of the bearing to protect the same and journal from dust and dirt, and this box 30 is made with an opening to aline with oil-inlet 31 in the bearing and with which oil-supply pipes 32 communicate.

On top of frame 5 a swinging bar 33 is supported between its ends upon and is swung by a lever 34. This lever 34 is disposed, preferably, in an inclined position in convenient reach of the driver and is pivoted near its lower end on a standard 35. The lower end of this lever 34 is bifurcated to receive swinging bar 33 to operate disk-cleaners 36, as will now be explained. These disk-cleaners 36 are secured on the lower ends of levers 37, pivoted between their ends on brackets 20 and having their upper ends pivotally connected to swinging bar 33, so that as said bar 33 is swung by the action of lever 34 all of the levers 37 will be moved on their pivots to swing two of the cleaners into engagement with their disks, while a reverse movement will throw the other cleaners into engagement with their disks, and when the levers 37 are permitted to rest in a vertical position (shown in Fig. 3) all of the cleaners will be out of engagement with the disks. A semicircular plate 38 is secured on the frame and is made with a central notch to receive the lower end of lever 34 and hold the cleaners out of engagement with the disks until cleaning is desired, when lever 34 can be readily operated by the driver.

A great many slight changes and alterations might be made in the general form and arrangement of the several parts described without departing from the spirit and scope of my invention, and hence I would have it understood that I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. A lister attachment for planters comprising divergent disks and an individual support for each disk to support the disks in advance of and on each side of the seed-dropping mechanism and means for separately adjusting each disk vertically.

2. A lister attachment for planters, comprising depending brackets adapted to be secured to a frame, bearings supported by the brackets, means for adjusting each bearing vertically on its supporting-bracket, journals in the bearings and disks secured on the journals in advance of and at an angle to the line of movement of the seed-dropping mechanism.

3. A lister attachment for planters, comprising divergent disks located in advance of seed-planting mechanism, and means connected with the bearing of each disk for independently adjusting the same vertically and horizontally and for independently securing the disks at varying heights and angles.

4. The combination with a planter, of brackets depending from a frame secured in advance of the planter-frame, bearings adjustable vertically in the brackets, journals in the bearings, disks secured on the journals, and forwardly and rearwardly projecting braces for said bearings.

5. In a disk lister attachment for planters, the combination of a U-shaped depending bracket, a split bearing notched at its ends, flanged plates in said notched ends of the bearings and secured to the bracket, forwardly and rearwardly extending braces for the bracket and bearing, a protecting-box covering the bearing, a journal in the bearing and a disk secured on the journal.

6. The combination with a planter, of a frame secured thereto, divergent disks supported in advance of the seed-dropping mechanism to cut a furrow, levers pivoted between their ends, disk-cleaners secured on the lower ends of said levers, a swinging bar pivotally connected with the upper arms of said levers and an operating-lever pivoted to said swinging bar to operate the cleaners, and a notched plate to center the operating-lever and hold all of the cleaners out of engagement with their disks.

In testimony whereof I have signed this specification in the presence of two subscribing witnesses.

IRA JAMES KAAR.

Witnesses:
M. L. EASTERDAY,
A. W. EASTERDAY.